(12) United States Patent
Steinert et al.

(10) Patent No.: US 7,726,989 B2
(45) Date of Patent: Jun. 1, 2010

(54) APPARATUS FOR SIGNAL AND/OR CURRENT TRANSMISSION BETWEEN TERMINALS

(75) Inventors: Alexander Steinert, Floss (DE); Frank Schroer, Weiden (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 11/545,804

(22) Filed: Oct. 10, 2006

(65) Prior Publication Data

US 2007/0141880 A1   Jun. 21, 2007

(30) Foreign Application Priority Data

Dec. 21, 2005   (EP)   ................... 05292768

(51) Int. Cl.
*H01R 13/00* (2006.01)

(52) U.S. Cl. ................................. 439/164

(58) Field of Classification Search ............. 439/165, 439/164
See application file for complete search history.

(56) References Cited

U.S. PATENT DOCUMENTS

| | | | |
|---|---|---|---|
| 5,630,723 A * | 5/1997 | Kawamoto | 439/164 |
| 5,752,843 A | 5/1998 | Kawamoto et al. | 439/164 |
| 5,800,190 A | 9/1998 | Ichikawa et al. | 439/164 |
| 5,813,875 A * | 9/1998 | Ishikawa et al. | 439/164 |
| 5,928,018 A * | 7/1999 | Dumoulin | 439/164 |
| 6,008,457 A | 12/1999 | Klein et al. | 200/61.54 |
| 6,261,112 B1 | 7/2001 | Mitsui | 439/164 |

\* cited by examiner

*Primary Examiner*—T C Patel
*Assistant Examiner*—Phuong Nguyen
(74) *Attorney, Agent, or Firm*—Sofer & Haroun, LLP

(57) ABSTRACT

An apparatus for signal and/or current transmission between terminals which can move in relation to one another and which are fitted, on the one hand, on a fixed stator and, on the other hand, on a rotor of a cassette that can rotate about a common axis with the stator. At least one flat ribbon cable, which is equipped with electrical conductors, runs in turns and forms a wound body (W), is arranged within the cassette between the terminals, the ends of the flat ribbon cable being connected to contact parts (19, 20) for the purpose of connecting ongoing cables. In order to accommodate the complete wound body (W) for its protection during transport and/or during storage, a pot-like cover (22) is provided which engages around said wound body and is fitted detachably to an essentially disc-shaped carrier (21).

4 Claims, 2 Drawing Sheets

APPARATUS FOR SIGNAL AND/OR CURRENT TRANSMISSION BETWEEN TERMINALS

RELATED APPLICATION

This application is related to and claims the benefit of priority from European Patent Application No. 05292768.8, filed on Dec. 21, 2005, the entirety of which is incorporated herein by reference.

FIELD OF THE INVENTION

The invention relates to an apparatus for signal and/or current transmission between terminals.

BACKGROUND

An apparatus for signal and/or current transmission between terminals which can move in relation to one another and which are fitted, on the one hand, on a fixed stator and, on the other hand, on a rotor of a cassette that can rotate about a common axis with the stator, in the case of which apparatus at least one flat ribbon cable, which is equipped with electrical conductors, runs in turns and forms a wound body, is arranged within the cassette between the terminals, and in the case of which apparatus the ends of the flat ribbon cable are connected to contact parts for the purpose of connecting ongoing cables.

Such an apparatus is required, for example, for transmitting a signal for the purpose of triggering the "airbag" of an impact protection system for motor vehicles. It is accommodated in the steering wheel of a motor vehicle for the purpose of transmitting electrical signals but also electrical current. With such an apparatus it is possible for the signal and/or current transmission to take place between fixed and moving parts of the motor vehicle without any sliding-action contacts or sliprings. Instead of the words "flat ribbon cable", the abbreviation "FRC" will be used below.

EP 0 417 350 A1 has disclosed an apparatus for contactless current transmission between two terminals by means of an FRC wound in the manner of a spring barrel to form a wound body. In the case of a relative rotary movement between the two terminals connected by means of the FRC, the wound-on FRC "breathes" like the spring of a clock. The turns of the wound FRC are compressed in one direction of rotation to a smaller diameter. In the other direction of rotation, they open out to a larger diameter again.

An apparatus corresponding to the apparatus in accordance with EP 0 417 350 A1 is described in DE 195 11 693 A1. This document concerns a swivel connector, which is referred to as a steering column switch with a volute spring. The volute spring represents a connecting line which is wound on in the form of a cylinder. The stator of this swivel connector is formed by the switch housing itself, in which a lid chamber is formed. An open ring chamber, which represents the rotor and in which the volute spring is arranged, is used as the lid for the lid chamber.

DE 37 32 124 A1 describes an apparatus in the case of which the wound body comprises an FRC which is wound in the form of a bifilar coil. The length of the FRC arranged in the bifilar coil may be shorter than an arrangement with an FRC wound in the manner of a spring barrel.

EP 0 735 631 B1 describes an apparatus for connecting two terminals which can rotate in relation to one another, in the case of which apparatus the wound body is split into two subwindings with an opposite winding sense and a U-shaped reversal point, between which an annular guide body is arranged. The guide body is used for guiding and mutually supporting the subwindings.

The apparatus described in EP 0 556 779 B1 likewise has a cassette comprising a stator and a rotor. It does not have a separate guide body for the subwindings. In the case of this apparatus, these subwindings are formed by a plurality of FRCs, which overall form a wound body and each of which is arranged with a U-shaped reversal point in the cassette of the apparatus. The FRCs are designed to be elastic, and the regions of their reversal points are so stable that the turns of the FRC are pressed in the direction of the stator on one side and the rotor on the other side. In the event of a rotation of a steering wheel of a vehicle equipped with such a cassette, all of the reversal points move in the circumferential direction of the cassette.

OBJECT AND SUMMARY

The invention is based on the object of designing the apparatus outlined at the outset such that the complete wound body is protected from damage prior to its installation into a cassette, during storage and in particular during transport.

This object is achieved according to the invention by the fact that, in order to accommodate the complete wound body for its protection during transport and/or during storage, a pot-like cover is provided which engages around said wound body and is fitted detachably to an essentially disc-shaped carrier.

The pot-like cover fitted to the carrier means that the wound body accommodated by it is held in its prefabricated form on the carrier and is protected from damage. In addition, the cover ensures that the prefabricated form of the wound body is maintained both during any storage which is carried out and also during transport. Prior to the wound body being installed in a cassette, only the cover of the carrier needs to be removed, which may advantageously be used as part of the rotor of the cassette.

In one preferred embodiment, a cover consisting of a noise-muffling material is used. It may then remain in its position in which it surrounds the wound body, as an additional function when the wound body is installed in a cassette comprising a stator and a rotor, and additionally be inserted into the stator of the cassette as the element for noise muffling. In the final position, only the connection to the carrier needs to be detached, which carrier is connected to the rotor of the cassette in the cassette.

BRIEF DESCRIPTION OF THE DRAWINGS

Exemplary embodiments of the subject matter of the invention are illustrated in the drawings, in which.

DETAILED DESCRIPTION

Figure 1:
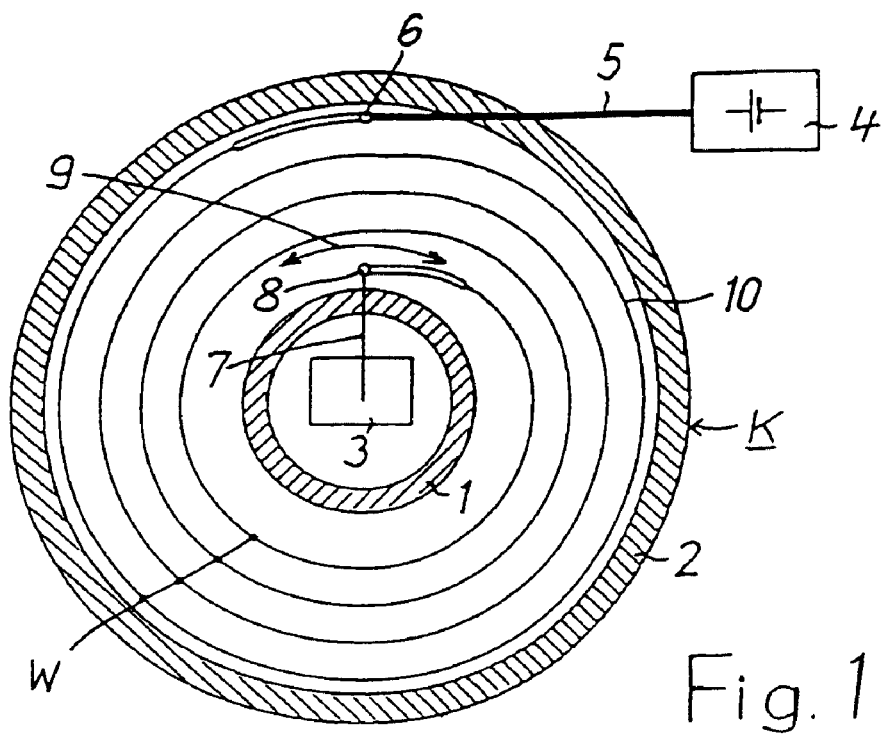
FIGS. 1 and 2 show plan views of an open cassette for an airbag in two different embodiments in a schematic illustration.
Figure 2:
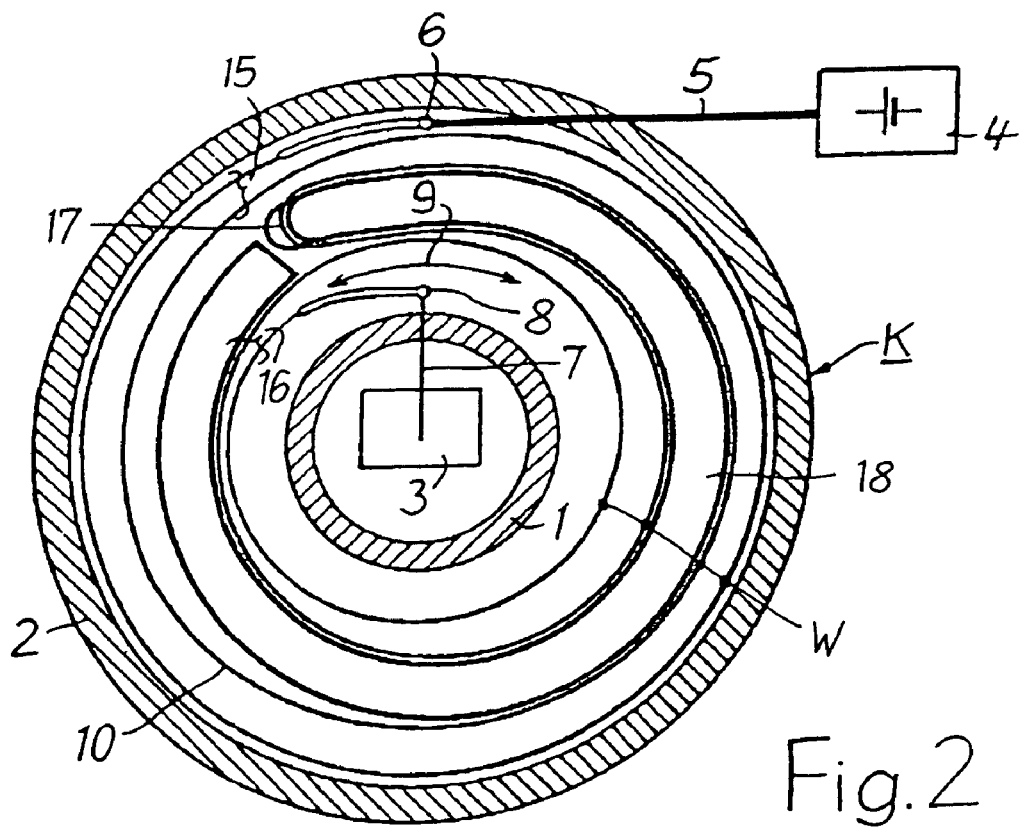
Figure 3:
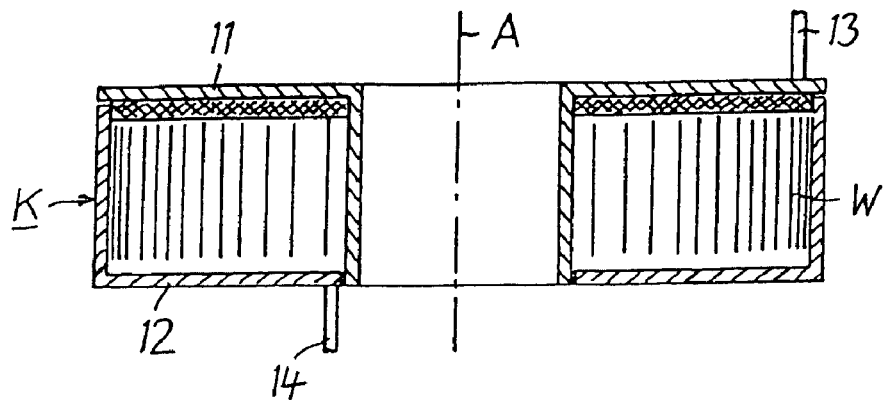
FIG. 3 shows a cross section of a cassette shown in FIG. 1.

FIGS. 1 to 3 serve merely as a general explanation of the principal design of a cassette for the airbag of a vehicle having two different embodiments of a wound body comprising an FRC. However, as a deviation from the illustration in FIGS. 1 and 2, the wound body may be designed to have any conceivable embodiment, for example in accordance with the document DE 37 32 124 A1 or EP 0 556 779 B1 mentioned at the outset.

FIG. 1 illustrates schematically two for example circular walls 1 and 2 of a cassette K. This cassette is intended to be installed in the steering column of a motor vehicle. In order to supply current to electronics 3, whose signal can be used to trigger an airbag, the cassette K is connected to the battery 4 of the motor vehicle. The battery 4 is connected to a terminal 6, in the form of a fixed point, of the cassette K via an electrical cable 5. The electronics 3 are connected to a terminal 8 of the cassette K via an electrical cable 7, it being possible for said terminal 8 to move in the direction of the double arrow 9. An FRC 10 with at least two electrical conductors is fitted between the two terminals 6 and 8. The conductors are preferably in the form of flat conductors. The design of the FRC 10 and the nature of its connection or termination to or at the terminals 6 and 8 are not illustrated in any more detail. In principle, they are known in various embodiments and are of no importance here.

As shown in FIG. 1, the FRC 10 can be arranged in the cassette K between the two terminals 6 and 8 in a plurality of turns, i.e. in the manner of a spring barrel of clocks. The rotary movement of the terminal 8, which is coupled to the steering wheel of the motor vehicle, is not significantly noticeable for an individual turn of the FRC 10. Only the diameter of the wound body W comprising all the turns of the FRC 10 is decreased or increased in size.

As shown in FIG. 3, the cassette K comprises a rotor 11 and a stator 12. The rotor 11 can rotate about the axis A of the cassette K with respect to the stator 12. The fixed stator 12 surrounds the wound body W, of which a few turns are illustrated schematically in FIG. 3. Ongoing electrical cables 13 and 14, which are passed out of the cassette K, are connected to the FRC 10 via corresponding contact parts, for example the cables 5 and 7 shown in FIG. 1.

In the embodiment of the cassette K shown in FIG. 2, identical parts as those in FIG. 1 are provided with the same reference numerals. The FRC 10 arranged between the two terminals 6 and 8 in this case forms a wound body W, whose turns are split into an outer winding region 15 and an inner winding region 16. The two winding regions 15 and 16 are indentified by brackets. They comprise, for example, in each case two to three turns. In the two winding regions 15 and 16, the turns of the FRC 10 have opposite winding directions. The winding regions 15 and 16 are connected to one another by an approximately U-shaped reversal point 17. An integral, annular guide body 18 which surrounds the reversal point 17 is fitted between the two winding regions 15 and 16.

Figure 4:
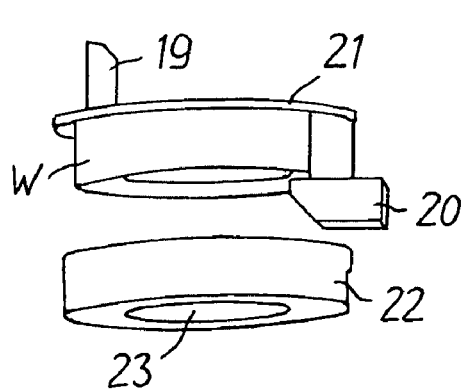
FIG. 4 shows the apparatus in accordance with the invention prior to its assembly, likewise in a schematic illustration.
Figure 6:
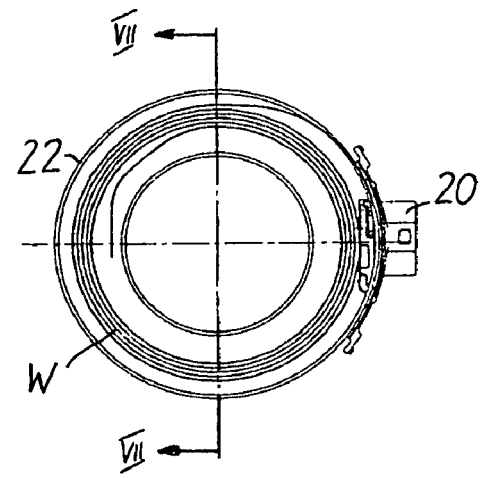
FIG. 6 shows a section through FIG. 5 along the line VI-VI.
Figure 5:
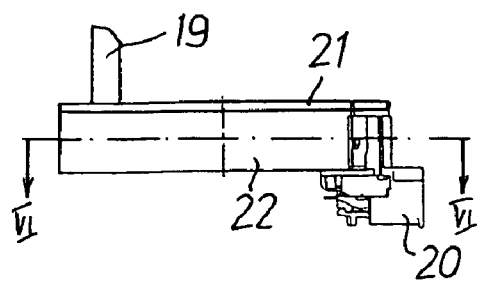
FIG. 5 shows the assembled apparatus shown in FIG. 3.

In all embodiments of the apparatus, the wound body W is equipped with contact parts 19 and 20 at the ends of the FRC 10, said contact parts 19 and 20 being indicated schematically in FIGS. 4 and 5. They are provided, for example, with contact pins, which are electrically conductively connected to the conductors of the FRC 10. Mating contacts can be inserted into the contact parts 19 and 20 and are fitted to the ongoing cables 5 and 7 or 13 and 14. The contact part 19 is fixed to an essentially disc-shaped carrier 21, which is part of the rotor 11 of a cassette K, while the contact part 20 intended for the stator 12 of the cassette K is held separately.

Figure 7:
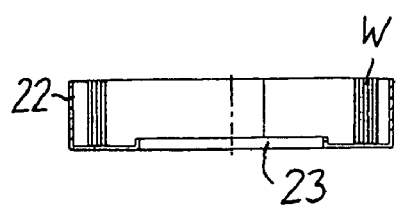
FIG. 7 shows a section through FIG. 6 along the line VII-VII.

In one preferred embodiment, the carrier 21 is in the form of an annular disc. It preferably consists of a dimensionally stable plastic, such as polyoxymethylene (POM) or polybutyl terephthalate (PBT). The wound body W bears against the carrier 21 in its final position, which in this case is decisive. It is held in this final position shown in FIG. 5 by a pot-like cover 22, which is detachably connected to the carrier 21. This final position is shown schematically in FIG. 7. In a practical embodiment the cover 22 has, in its base, a central hole 23, through which parts of a steering wheel, for example, protrude in the mounted position.

The apparatus shown in FIG. 5 is completed as follows, for example:

A wound body W is formed from an FRC 10, as is shown, for example, in FIG. 1. In this case, the contact parts 19 and 20 are fitted to the ends of the FRC 10. The contact part 19 is then fixed to or in the carrier 21, and the wound body W is placed on the attachment 22 so as to surround it. In this case, the contact part 20 assumes the position shown in FIG. 4. Then, the cover 22 is pushed over the wound body W and is fitted detachably to the carrier 21, for example by means of clips. It may have a depression at its outer circumferential surface, into which depression the contact part 20 engages. The cover 22 completely accommodates the wound body W and also holds the contact part 20 in position. The wound body W is thereby protected from damage and is stabilized in its predetermined form. The entire apparatus can then be stored or be transported for further processing, for example by a customer, to an appropriate installation site.

For installation in a cassette K, the cover 22 needs to be detached from the carrier 21, which itself is part of the rotor 11 of the cassette K. The cover 22 can be completely removed from the apparatus and dispensed with. It then advantageously consists of a plastic, which has been obtained from waste materials by means of recycling.

In one preferred embodiment, the cover 22 consists of a noise-muffling material, such as foamed polyurethane or a nonwoven. It is then advantageously incorporated, together with the wound body W, in a cassette K and fixedly connected to the stator 12 thereof by means of adhesive bonding. The cover 22 is then a noise-muffling cladding for the stator 12, which bears against its inner walls.

The invention claimed is:

1. A prefabricated device for the insertion into an apparatus for signal and/or current transmission between terminals which can move in relation to one another and which are fitted, on the one hand, on a fixed stator and, on the other hand, on a rotor of a cassette that can rotate about a common axis with the stator, said prefabricated device comprising:
   at least one flat ribbon cable, having electrical conductors, running in turns and forming a prefabricated wound body to be arranged within the cassette between the terminals, wherein the ends of said flat ribbon cable are connected to contact parts which are provided to be placed at said terminals, and
   a removable pot-like cover engaged around said prefabricated wound body, including said flat ribbon cable and said contact parts connected to the ends of said prefabricated wound body, wherein said pot-like cover is fitted detachably to a substantially disc-shaped carrier to which one of the contact parts is also fixed, said pot like cover being removed and discarded prior to installation of said prefabricated wound body into said cassette.

2. Apparatus according to claim 1, wherein said pot-like cover is made from a noise-muffling material.

3. Apparatus according to claim 1 wherein said disc-shaped carrier, to which said pot-like cover and said one of the contact parts are fixed, is dimensioned such that it may form at least a portion of said a rotor of a cassette after the pot like cover is removed.

4. A prefabricated device for an apparatus for signal and/or current transmission between terminals which can move in relation to one another and which are fitted, on the one hand, on a fixed stator and, on the other hand, on a rotor of a cassette that can rotate about a common axis with the stator, said prefabricated device which is provided for the insertion into said cassette comprising:

at least one flat ribbon cable, having electrical conductors, running in turns and forming a prefabricated wound body to be arranged within the cassette between the terminals, wherein the ends of said flat ribbon cable are connected to contact parts which are provided to be placed at said terminals, and a pot like cover engaged around said prefabricated wound body, including said flat ribbon cable and said contact parts connected to the ends of said prefabricated wound body, wherein said pot like cover is fitted detachably to a substantially disc-shaped carrier to which one of the contact parts is fixed and wherein said pot like cover can be removed from said carrier before the insertion of the device into said cassette.

* * * * *